(12) United States Patent
Norman et al.

(10) Patent No.: US 6,401,884 B2
(45) Date of Patent: Jun. 11, 2002

(54) FLUIDIC DAMPENING DEVICE

(76) Inventors: Ralph S. Norman, 290 A Trousdale Dr., Chula Vista, CA (US) 91910; Dennis Patterson, 17615 Adler St., #N, Hesperia, CA (US) 92345

( * ) Notice: Subject to any disclaimer, the term of this patent is extended or adjusted under 35 U.S.C. 154(b) by 0 days.

(21) Appl. No.: 09/748,555

(22) Filed: Dec. 27, 2000

Related U.S. Application Data

(60) Provisional application No. 60/173,368, filed on Dec. 28, 1999.

(51) Int. Cl.$^7$ ................................................ F16F 9/14
(52) U.S. Cl. ...................................... 188/310; 188/306
(58) Field of Search ............................... 188/310, 306; 280/272, 90

(56) References Cited

U.S. PATENT DOCUMENTS

| | | | | |
|---|---|---|---|---|
| 1,066,255 A | * | 7/1913 | Cubbison et al. | 188/310 |
| 1,128,228 A | * | 2/1915 | Collar | 188/306 |
| 1,506,495 A | * | 8/1924 | MacRae | 188/306 |
| 1,540,341 A | * | 6/1925 | Kirby | 188/306 |
| 1,628,811 A | * | 5/1927 | Shultz et al. | 188/306 |
| 1,957,997 A | * | 5/1934 | Fieldman | 188/306 |
| 2,009,678 A | * | 7/1935 | Pennington | 188/310 |
| 4,773,514 A | * | 9/1988 | Gustafsson | 188/306 |
| 5,516,133 A | * | 5/1996 | Motrenec et al. | 280/272 |
| 6,145,637 A | * | 11/2000 | Hopey | 188/306 |

* cited by examiner

Primary Examiner—Christopher P. Schwartz
Assistant Examiner—Benjamin A Pezzlo
(74) Attorney, Agent, or Firm—Thompson E. Fehr

(57) ABSTRACT

A fluidic dampening device having a housing containing a rotatably mounted wiper that sealingly moves past the side walls, bottom, and peripheral wall of the housing as well as a faceplate attached to the top of the housing. The housing contains a bypass channel that has a first port in the first side wall of the chamber and a second port in the second side wall of the chamber. A control shaft is rotatably mounted within the housing. The control shaft has indentations of varying sizes formed at distinct points around the shaft with areas having no indentation between each consecutive pair of indentations and is so located in the housing that either no indentation or only one indentation lies within the bypass channel at a given time. When no indentation has been rotated into the bypass channel, the control shaft completely blocks the bypass channel. Optionally, channels exist in the bottom of the faceplate or in the portion of the housing which forms the bottom of the chamber. These channels create areas where no dampening occurs.

1 Claim, 6 Drawing Sheets

FLUIDIC DAMPENING DEVICE

CROSS-REFERENCE TO RELATED APPLICATION

This is a non-provisional application based upon provisional application Ser. No. 06/173,368, which was filed on Dec. 28, 1999.

BACKGROUND OF THE INVENTION

1. Field of the Invention

This invention relates to a device that uses a fluid to dampen a force that tends to move the plane of rotation of a steerable wheel or wheels of a vehicle having a shaft used to steer such wheel or wheels away from being generally parallel to the frame of such vehicle. It also relates to any steering device, such as a ski of a snowmobile or the exhaust jet of a personal watercraft, that uses a shaft or the like in the steering process.

2. Description of the Related Art

U.S. Pat. No. 4,773,514 for a Hydraulic Damping Device is quite similar to the present invention.

A wing 23 is rotatably mounted within a hollow chamber 11 of a casing 6. Either the wing 23 or the casing 6 is rigidly attached to a portion of a motorcycle that rotates with the fork that holds the front wheel of a motorcycle. The other of these two elements, i.e., either the casing 6 or the wing 23 is rigidly connected to the frame of the motorcycle. Therefore, whenever the front wheel of the motorcycle is turned to the left or right, there will be relative motion between the wing 23 and the casing 6.

The chamber 11 is sealed to prevent the leakage of a fluid and is filled with hydraulic fluid. The wing 23 is "dimensioned to fit sealingly to the bottom part 12, the cover 13 and the inside of the peripheral wall 10c" so that hydraulic fluid cannot pass around the wing 23. Movement of the wing 23 is, consequently, impeded by the hydraulic fluid, thereby dampening the turning left and right of the front wheel.

The degree of dampening is controlled with a channel 24 in the cover 13 for the casing 6. The channel 24 has ports near the sides 10a, 10b of the chamber 11 which permit hydraulic fluid to flow around the wing 23. The effective cross-sectional area of channel 24 is controlled by a screw 27 that by being turned is inserted farther into channel 24. The farther screw 27 is inserted into channel 24, the smaller is the effective area of channel 24 and the greater is the impedance to the flow of hydraulic fluid and, therefore, the dampening.

As the knob 29 which turns the screw 27 is moved radially, a spring-loaded ball 33 fits into a number of circumferentially distributed bores 32 having a smaller diameter than the ball 33 to "facilitate proper setting" of the screw 27. Still, it is difficult precisely to determine the degree to which the screw 27 has intruded within the channel 24 and, therefore, the degree of dampening that will be achieved.

Moreover, a somewhat complex system employing two valve balls 34, 35 and a pressure spring 42 which maintains the balls 34, 35 in their open positions until the flow of hydraulic fluid, caused by a rapid turning of the front wheel, forces one or the other of the balls 34, 35, depending upon the direction of the turn, closed. Unfortunately, contaminants, such as those created through the wear of parts in the Hydraulic Damping Device, can cause such a valving system to stick.

Additionally, bypass channels 25 and 26 eliminate dampening near the center of chamber 11 by allowing hydraulic fluid to flow from the center to the sides of chamber 11. The extent of the central area where dampening has been eliminated is determined by rotating a sleeve to align one of several different openings 56a, b, c, d and 57a, b, c, d with one of several different connecting ports 47a, b, c, d and 48a, b, c, d.

Having all ports for the bypass channels in the cover 13, however creates the possibility that when the wing 23 is near either side 10a or side 10b, the wing will either be farther toward such side 10a or 10b than is any port or will be under the port closest to such side 10a or 10b. Because the wing 23 is "dimensioned to fit sealingly to the bottom part 12, the cover 13 and the inside of the peripheral wall 10c" so that hydraulic fluid cannot pass around the wing 23, either of these possible situations will preclude hydraulic fluid from being transferred to the side of the wing 23 that is toward the nearer side 10a, 10b and thereby impede the proper functioning of the wing 23.

The angular size of chamber 11 is not specified. From FIG. 2, however, it appears to be substantially less than 180 degrees.

Ours can move through a full 180 degrees.

SUMMARY OF THE INVENTION

The basic features of the present Fluidic Dampening Device are similar to those of U.S. Pat. No. 4,773,514, i.e., a housing contains a generally sector-shaped chamber having a first side wall, a second side wall, a peripheral wall, a bottom, and a rotatably mounted wiper. A faceplate is sealingly mounted to the top of the housing. And the wiper has dimensions such that it sealingly moves past the faceplate, the bottom of the housing, and the periphal wall of the housing.

There is, however, only a single bypass channel; and it is contained within the housing, rather than in the faceplate. Moreover, the bypass channel is kept as simple as possible by containing no valving. This eliminates the possibility of a contaminant causing such a valve to stick.

The bypass channel has a first port in the first side wall, preferably near the peripheral wall, and a second port in the second side wall, preferably near the peripheral wall. Near the first port, the first side wall may contain an extension that is made simply to accommodate the tool that create the chamber in the housing if this is done by grinding or drilling; similarly, near the second port, the second side wall may contain an extension that is made simply to accommodate the tool that create the chamber in the housing if this is done by grinding or drilling.

Having the ports in the side walls eliminates the possibility that the wiper can be so close to a side wall that no fluid can be transferred to the side of the wiper that is nearer to that side wall.

And the amount of dampening is controlled by having indentations of varying sizes formed at distinct points around a control shaft situated so that either no indentation or only one indentation lies within the bypass channel at a given time. Moreover, each indentation in the shaft is aligned with a détente in the bottom side of a knob attached to the top of the shaft. A spring is placed in a vertical corridor in the housing, which vertical corridor is closed at the bottom. A ball is placed atop the spring so that it presses against the bottom of the knob. The size of each détente is sufficiently large that the ball entering a detente is very perceptible to one turning the knob. Also, a unique visual indicator, preferably a numeral, is placed above each détente. Therefore, a user knows precisely the size of the indentation that is in the bypass channel and, therefore, the degree of dampening that will occur.

If the knob is stopped between détentes, no indentation will be within the bypass channel, i.e., the bypass channel will be completely closed so that dampening is at a maximum.

Grooves are placed in the bottom of the faceplate at desired locations to select areas where there will be no dampening because a viscous fluid, preferably hydraulic fluid, that will be placed in the chamber can flow above the wiper as the wiper turns. This is much simpler than the bypass channels of U.S. Pat. No. 4,773,514 and, consequently, less prone to being clogged by contaminants.

The location of such grooves is selected at the time of manufacture and is, preferably, symmetrical about the center of the chamber and extends to each side wall of the chamber, leaving an area in the center of the chamber where dampening will occur.

Finally, the sector of the chamber in the Hydraulic Damping Device of U.S. Pat. No. 4,773,514 covers only approximately ninety degrees, whereas the sector of the chamber in the present Fluidic Dampening Device is much larger, preferably approximately one hundred twenty degrees.

DESCRIPTION OF THE PREFERRED EMBODIMENT

Figure 1:
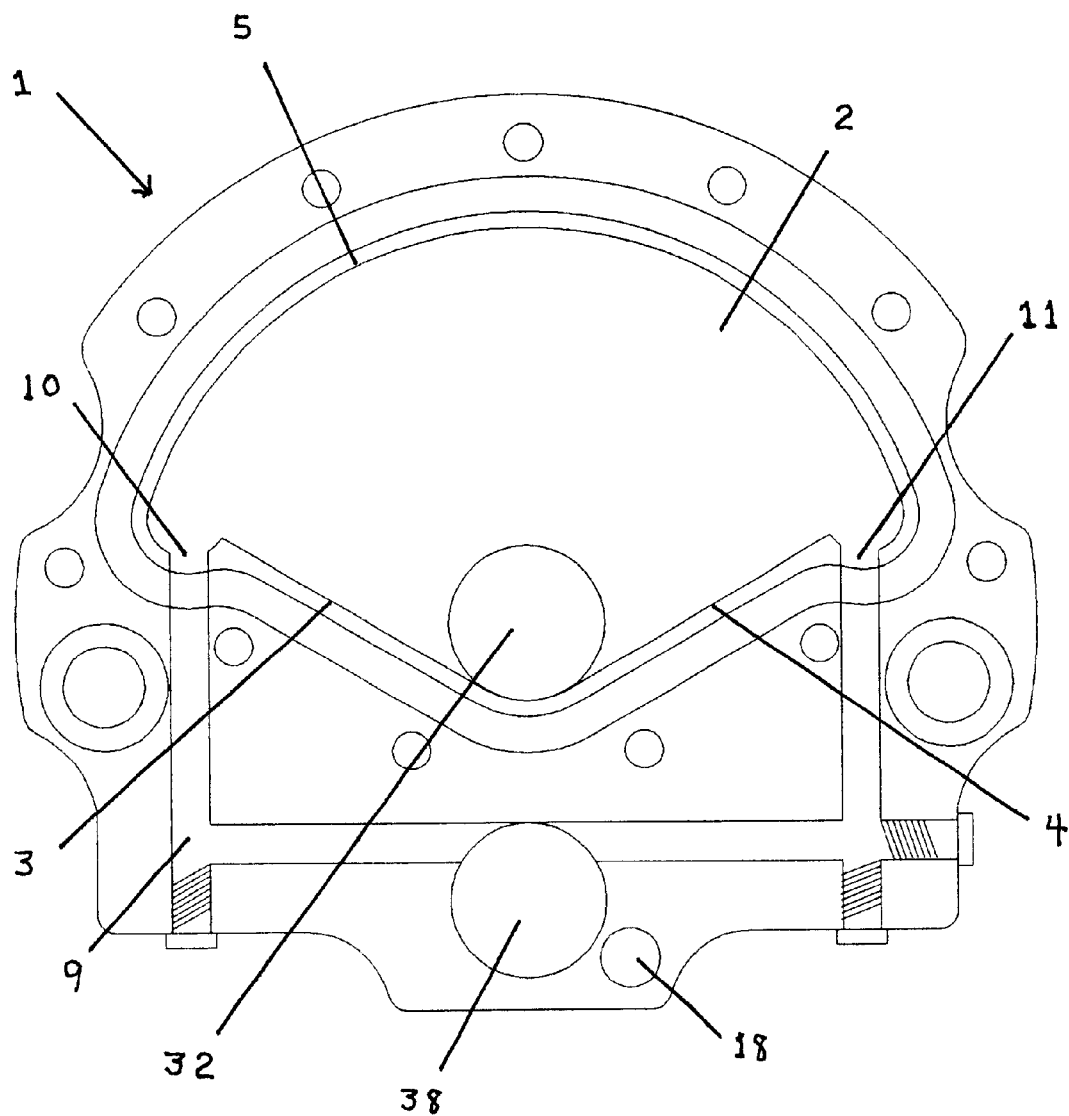
FIG. 1 is a cutaway view of the housing for the Fluidic Dampening Device.
Figure 2:
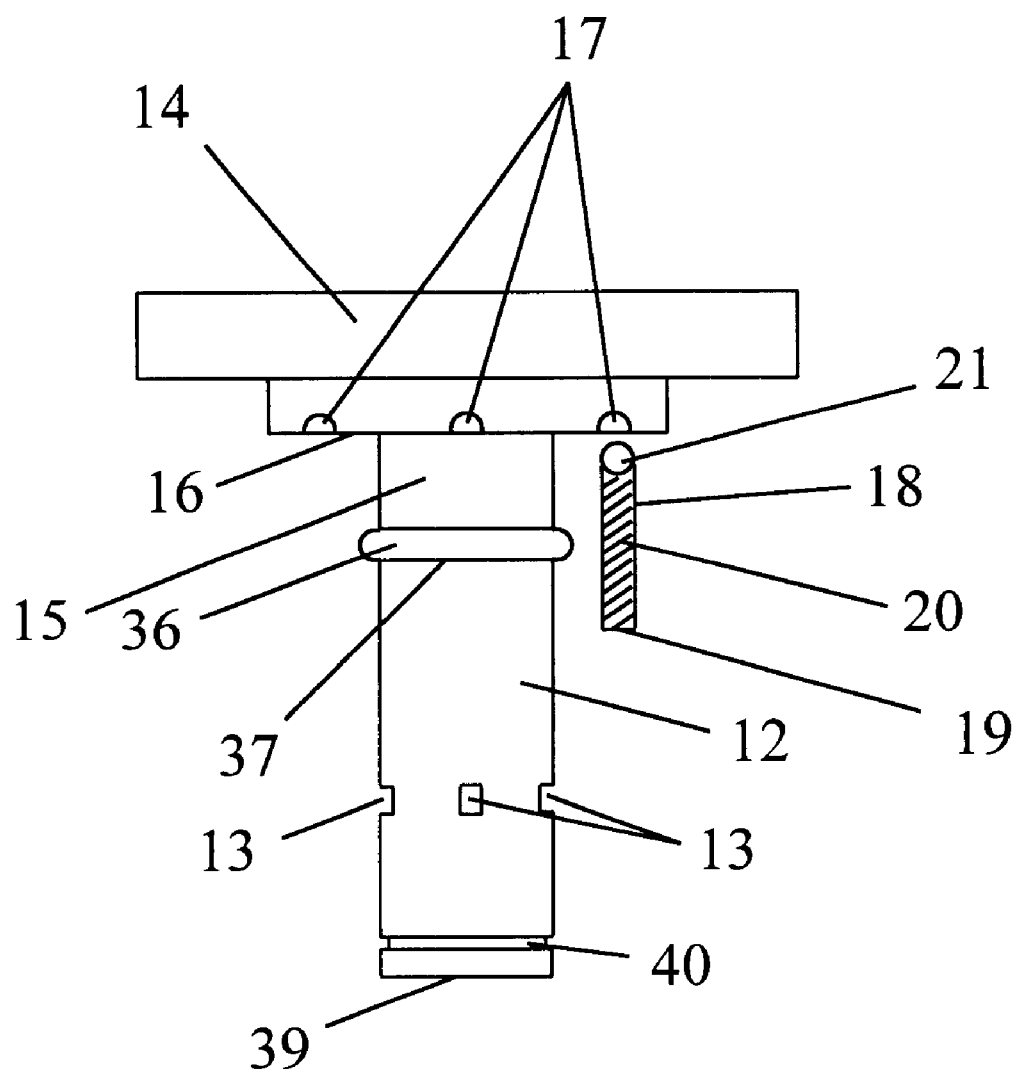
FIG. 2 shows the shaft.
Figure 3:
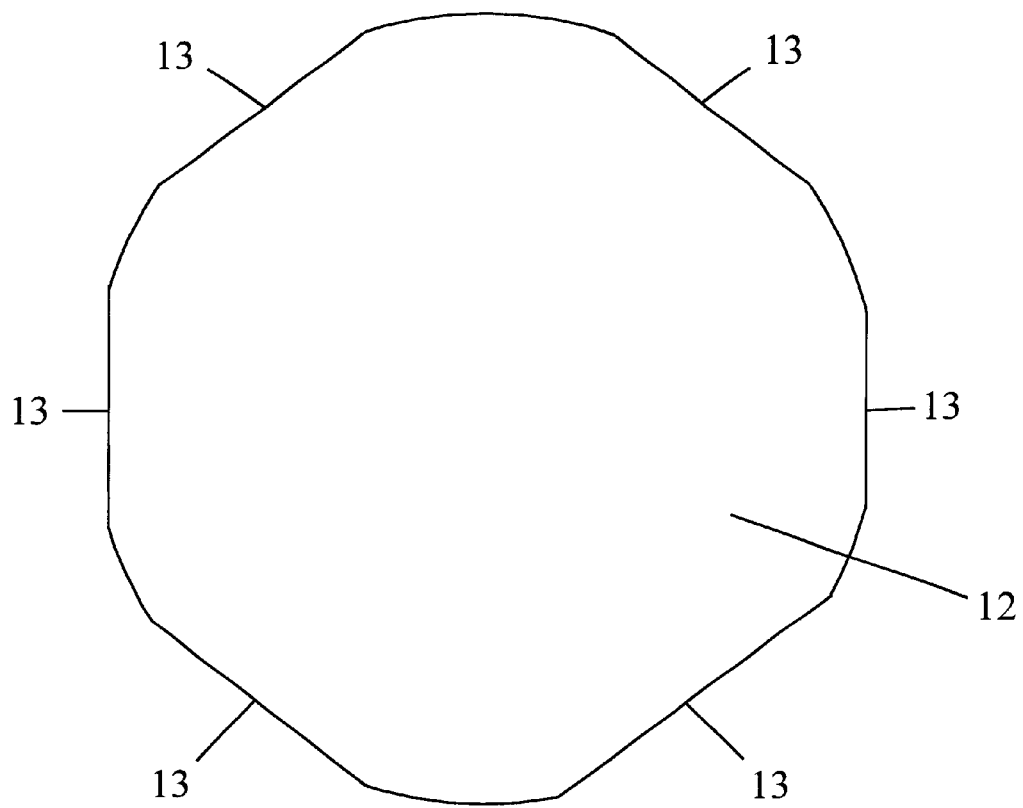
FIG. 3 is a cutaway view of the shaft showing the indentations.
Figure 4:
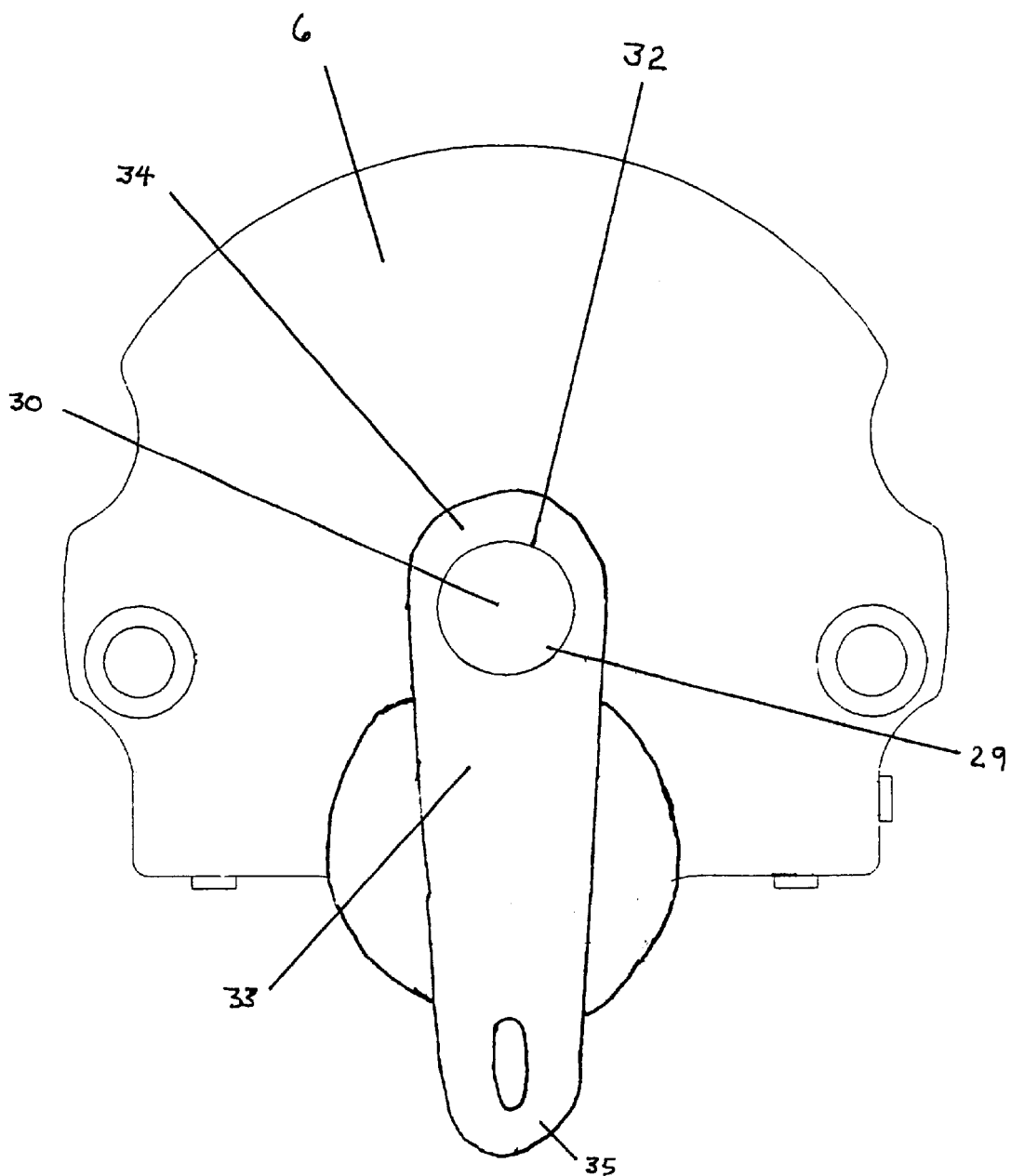
FIG. 4 illustrates the arm.
Figure 5:
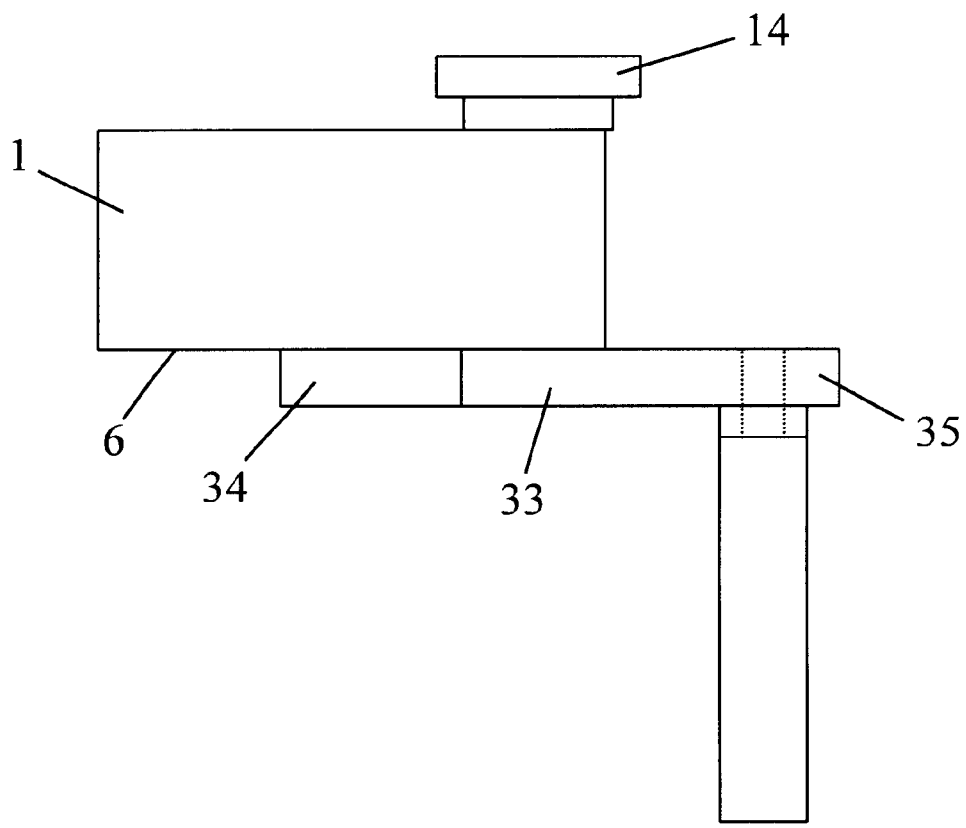
FIG. 5 portrays another view of the arm.
Figure 6:
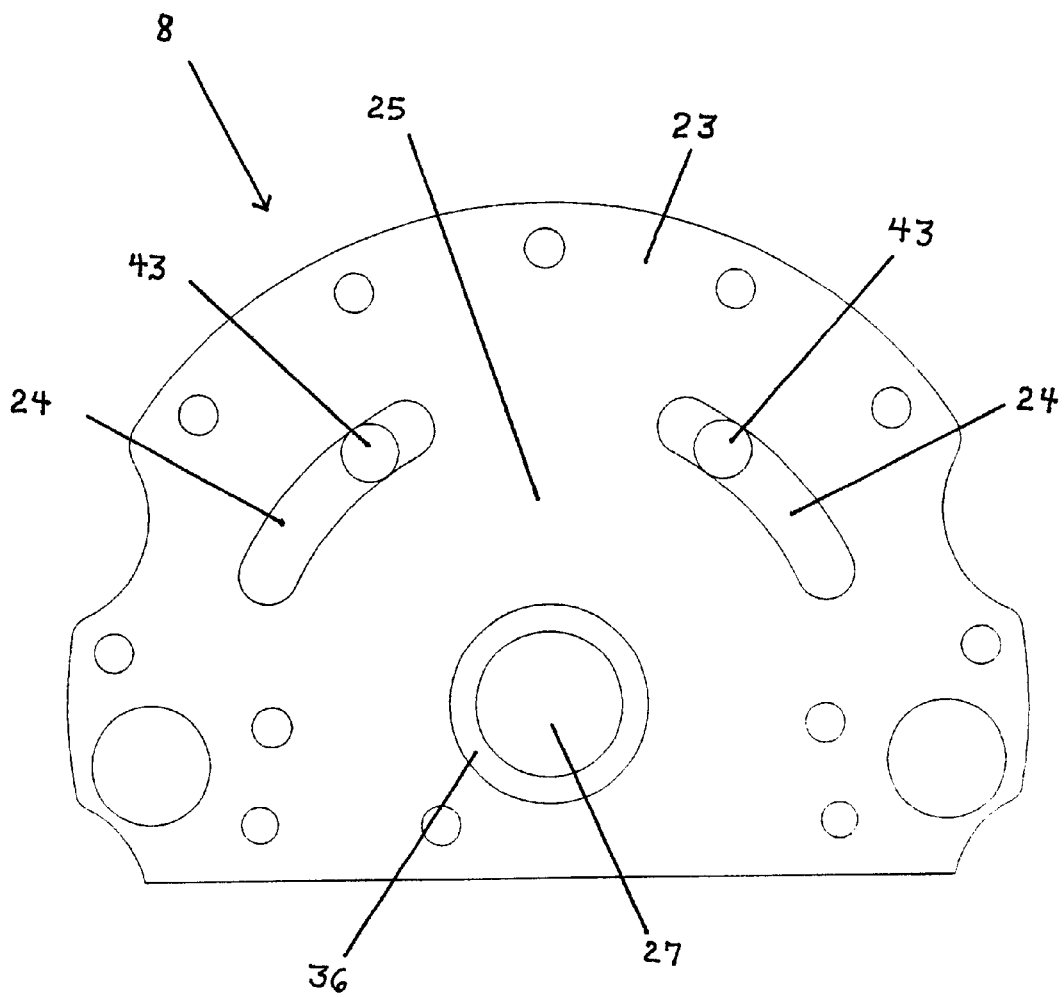
FIG. 6 portrays the bottom of the faceplate.

The Fluidic Dampening Device comprises a housing 1 having a generally sector-shaped chamber 2 with a first side wall 3, a second side wall 4, a peripheral wall 5, a bottom 6, and a rotatably mounted wiper 7. A faceplate 8 is sealingly mounted to the top of the housing 1. And, as discussed above, the wiper 7 has dimensions such that it sealingly moves past the faceplate 8, the housing 1 at the bottom 6 of the chamber 2, and the peripheral wall 5 of the housing 1.

The housing 1 contains a bypass channel 9 having a first port 10 in the first side wall 3, preferably near the peripheral wall 5, and a second port 11 in the second side wall 4, preferably near the peripheral 5.

A control shaft 12 has indentations 13 of varying sizes formed at distinct points around the shaft 12 with areas having no indentation 13 between each consecutive pair of indentations 13 and, as mentioned above, is so located in the housing 1 that either no indentation or only one indentation 13 lies within the bypass channel 9 at a given time. Of course, the control shaft 12 is rotatably mounted in the housing 1 and completely blocks the bypass channel 9 when no indentation 13 has been rotated into the bypass channel 9.

A knob 14 is attached near the top 15 of the shaft 12. In the bottom 16 of the knob 14 are détentes 17. Each indentation 13 in the shaft 12 is aligned with a détente 17. Moreover, the housing 1 contains a vertical corridor 18 which is closed at the bottom 19. A spring 20 is placed in the vertical corridor 18 so that it rests on the bottom 19. A ball 21 is located atop the spring 20 in such a position that it presses against the bottom 16 of the knob 14 and will enter the various détentes 17 as the knob 14 is rotated. The size of each détente 17 is sufficiently large that the ball 21 entering a détente 17 is very perceptible to one turning the knob 14. Additionally, a unique visual indicator 22, preferably a numeral, is placed above each détente 17.

The bottom 23 of the faceplate 8 contains grooves 24 so that the viscous fluid, preferably hydraulic fluid, which is placed in the chamber 2 can flow above the wiper 7 as the wiper 7 is rotated. Optionally, the portion of the housing 1 which forms the bottom 6 of the chamber 2 could contain the grooves 24. Preferably, there are two grooves 24; and such grooves 24 are preferably located symmetrically about the center 25 of the chamber 2. The grooves 24 preferably extend to each side wall 3, 4 of the chamber 2, leaving an area in the center 25 of the chamber 2 where dampening will occur.

The sector of the chamber 2 preferably covers one hundred twenty degrees.

The end of the wiper 7 about which the wiper 7 rotates is cylindrically shape and extends above and below the wiper blade 26. A depression 27 in the bottom 23 of the faceplate 8 contains the top 28 of the cylindrical portion 29; and the bottom 30 of the cylindrical portion 31 extends through an aperture 32 in the housing 1 at the bottom 6 of the chamber 2.

An arm 33 having a first end 34 is rigidly attached near such first end 34 to the cylindrical portion 29 near the bottom 30 of the cylindrical portion 29.

Preferably, the second end 35 of the arm 34 is rigidly attached to the frame of a vehicle on which the Fluidic Dampening Device is to be used; and the housing is rigidly connected to a portion of the vehicle that rotates when the steering device, such as a front wheel or wheels, is turned to steer the vehicle. Alternatively, however, the second end 35 of the arm 34 is rigidly connected to a portion of the vehicle; and the housing 1 is rigidly attached to a portion of the vehicle that rotates when the steering device is turned to steer the vehicle.

To prevent fluid from leaking from the chamber 2 a seal 36, preferably an O-ring, fits into a groove 37 located between the indentations 13 and the knob 14, another O-ring fits into a channel 37 adjacent to an aperture 38 in the housing 1 through which the bottom 39 of the shaft 12 extends. A keeper ring groove 40 near the bottom 39 of the shaft 12 holds the shaft 12 in the housing 1. Also, a seal 36 is located in a channel 41 in the housing 1 so that such seal 36 is between the housing 1 and the faceplate 8. Finally, seals 36 are located in the depression 27 that fits around the cylindrical portion 29 of the wiper 7, in a channel 42 of the housing 1 around the aperture 32 through which the bottom 30 of the cylindrical portion 31 of the wiper 7 extends, and around the cylindrical portion 31 near bottom 30 and outside but near the housing 1.

The fluid may be inserted through apertures 43 in the faceplate 8.

We claim:

1. A fluidic dampening device, which comprises:
   a housing having a generally sector-shaped chamber with a first side wall, a second side wall, a peripheral wall, and a bottom, said housing also containing a bypass channel having a first port in the first side wall and a second port in the second side wall;
   a control shaft, said control shaft having indentations of varying sizes formed at distinct points arount the shaft with areas having no indentation between each consecutive pair of indentations, rotatably mounted in said housing so that either no indentation or only one indentation lies within the bypass channel at a given time;

a faceplate sealingly mounted to the top of said housing; and a wiper rotatably mounted within said housing and having dimensions such that said wiper sealingly moves past said faceplate, said housing at the bottom of the chamber, and the peripheral wall.

* * * * *